United States Patent
Stenzel et al.

(10) Patent No.: US 7,608,234 B2
(45) Date of Patent: Oct. 27, 2009

(54) PRECIPITATED SILICAS WITH PARTICULAR PORE SIZE DISTRIBUTION

(75) Inventors: Oleg Stenzel, Cologne (DE); Hans-Detlef Luginsland, Hoboken, NJ (US); Stefan Uhrlandt, Belle Mead, NJ (US); Andre Wehmeier, Rheine (DE)

(73) Assignee: Degussa AG, Duesseldorf (DE)

( * ) Notice: Subject to any disclaimer, the term of this patent is extended or adjusted under 35 U.S.C. 154(b) by 225 days.

(21) Appl. No.: 11/517,395

(22) Filed: Sep. 8, 2006

(65) Prior Publication Data

US 2007/0100057 A1 May 3, 2007

(30) Foreign Application Priority Data

Sep. 9, 2005 (DE) .................. 10 2005 043 202

(51) Int. Cl.
*C01B 33/12* (2006.01)

(52) U.S. Cl. ........................ 423/335; 423/339

(58) Field of Classification Search ........... 423/335, 423/339

See application file for complete search history.

(56) References Cited

U.S. PATENT DOCUMENTS

| | | | |
|---|---|---|---|
| 4,001,379 A | 1/1977 | Tuerk et al. | |
| 4,094,771 A | 6/1978 | Brandt et al. | |
| 4,704,414 A | 11/1987 | Kerner et al. | |
| 5,116,886 A | 5/1992 | Wolff et al. | |
| 5,484,581 A | 1/1996 | Esch et al. | |
| 6,013,234 A | 1/2000 | Ray et al. | |
| 6,123,762 A | 9/2000 | Barthel et al. | |
| 6,127,468 A | 10/2000 | Cruse et al. | |
| 6,140,445 A | 10/2000 | Su et al. | |
| 6,180,076 B1 | 1/2001 | Uhrlandt et al. | |
| 6,204,339 B1 | 3/2001 | Waldman et al. | |
| 6,207,783 B1 | 3/2001 | Petty et al. | |
| 6,225,397 B1 | 5/2001 | Materne et al. | |
| 6,258,914 B1 | 7/2001 | Su et al. | |
| 6,268,424 B1 * | 7/2001 | Blume et al. .............. 524/493 |
| 6,323,277 B1 | 11/2001 | Petty et al. | |
| 6,395,856 B1 | 5/2002 | Petty et al. | |
| 6,528,673 B2 | 3/2003 | Cruse et al. | |
| 6,602,964 B2 | 8/2003 | Huang et al. | |
| 6,608,125 B2 | 8/2003 | Cruse et al. | |
| 6,613,309 B2 | 9/2003 | Uhrlandt et al. | |
| 6,624,230 B2 | 9/2003 | Luginsland | |
| 6,683,135 B2 | 1/2004 | Cruse et al. | |
| 6,702,887 B2 | 3/2004 | Uhrlandt et al. | |
| 6,846,865 B2 | 1/2005 | Panz et al. | |
| 6,849,754 B2 | 2/2005 | Deschler et al. | |
| 6,893,495 B2 | 5/2005 | Korth et al. | |

(Continued)

FOREIGN PATENT DOCUMENTS

DE 2447713 4/1976

(Continued)

*Primary Examiner*—Timothy C Vanoy
*Assistant Examiner*—Serena L Hanor
(74) *Attorney, Agent, or Firm*—Oblon, Spivak, McClelland, Maier & Neustadt, L.L.P.

(57) ABSTRACT

Precipitated silicas useful, for example, as fillers in elastomer mixtures or vulcanizates have a particularly broad pore size distribution of the pores with a pore diameter smaller than that of the maximum of the derivative of the pore volume distribution function, and have simultaneously very low microporosity and high rubber activity.

18 Claims, 2 Drawing Sheets

U.S. PATENT DOCUMENTS

| | | |
|---|---|---|
| 6,899,951 B2 | 5/2005 | Panz et al. |
| 6,960,251 B2 | 11/2005 | Uhrlandt et al. |
| 6,984,683 B2 | 1/2006 | Luginsland et al. |
| 7,022,375 B2 | 4/2006 | Schachtely et al. |
| 7,074,457 B2 | 7/2006 | Panz et al. |
| 7,074,876 B2 | 7/2006 | Cruse et al. |
| 7,078,551 B2 | 7/2006 | Cruse et al. |
| 7,081,500 B2 | 7/2006 | Cruse et al. |
| 7,208,038 B2 | 4/2007 | Korth et al. |
| 7,220,449 B2 | 5/2007 | Schachtely et al. |
| 2001/0021767 A1 | 9/2001 | Drucker et al. |
| 2002/0055564 A1 | 5/2002 | Cruse et al. |
| 2002/0055568 A1 | 5/2002 | Cruse et al. |
| 2002/0055646 A1 | 5/2002 | Cruse et al. |
| 2003/0003040 A1* | 1/2003 | Lindner et al. .............. 423/335 |
| 2003/0082090 A1 | 5/2003 | Blume et al. |
| 2003/0130388 A1 | 7/2003 | Luginsland et al. |
| 2003/0225195 A1 | 12/2003 | Cruse et al. |
| 2003/0229166 A1 | 12/2003 | Krafcyk et al. |
| 2004/0210001 A1 | 10/2004 | Cruse et al. |
| 2005/0032965 A1 | 2/2005 | Valero |
| 2005/0187334 A1 | 8/2005 | Blume et al. |
| 2006/0014870 A1 | 1/2006 | Cruse et al. |
| 2006/0093541 A1 | 5/2006 | Uhrlandt et al. |
| 2006/0099129 A1 | 5/2006 | Stenzel et al. |
| 2006/0100344 A1 | 5/2006 | Stenzel et al. |
| 2006/0137575 A1 | 6/2006 | Stenzel et al. |
| 2006/0165581 A1 | 7/2006 | Stenzel et al. |
| 2006/0254463 A1 | 11/2006 | Luginsland et al. |
| 2007/0059232 A1 | 3/2007 | Stenzel et al. |

FOREIGN PATENT DOCUMENTS

| | | |
|---|---|---|
| DE | 3437473 A1 | 4/1986 |
| DE | 40 04 781 A1 | 8/1991 |
| DE | 196 09 619 A1 | 9/1997 |
| DE | 10124298 | 11/2002 |
| DE | 101 63 945 C1 | 5/2003 |
| DE | 102 23 658 A1 | 12/2003 |
| EP | 0501227 A1 | 9/1992 |
| EP | 0643015 | 3/1995 |
| EP | 090 1986 | 3/1999 |
| EP | 0937755 | 9/1999 |
| EP | 0942029 | 9/1999 |
| WO | WO 99/09036 | 2/1999 |
| WO | WO 03/016215 | 2/2003 |

* cited by examiner

PRECIPITATED SILICAS WITH PARTICULAR PORE SIZE DISTRIBUTION

BACKGROUND OF THE INVENTION

1. Field of the Invention

The present invention relates to precipitated silicas which have particularly broad pore size distribution of pores with a pore diameter smaller than that of the maximum of the derivative of the pore volume distribution function, with simultaneously very low microporosity and high rubber activity, to a process for their production and to their use as filler for rubber mixtures.

2. Description of the Related Art

The use of precipitated silicas in elastomer mixtures, e.g. tire tread mixtures, has long been known (EP 0501227). Stringent requirements are placed upon the use of silicas as reinforcing filler in rubber mixtures, for example those used for the production of pneumatic tires and of technical rubber products. The intention is that they can be incorporated and dispersed within the rubber easily and efficiently and that in combination with a coupling reagent, preferably a bifunctional organosilicon compound, they enter into chemical bonding with the rubber, leading to the desired high level of reinforcement of the rubber mixture. The reinforcing property can in particular be associated with high static stress values and a low abrasion value. Factors of decisive importance for the reinforcing property of the silicas are in particular the particle size, surface morphology and surface activity, and the coupling power of the coupling reagent.

The person skilled in the art is also aware that low-molecular-weight compounds, e.g. the bifunctional organosilicon compounds and vulcanization accelerators can undergo physi- and chemisorbtion within the pores of the microporous silica and thus retain only restricted ability to exert their function as rubber coupling agent or vulcanization accelerator for rubber crosslinking.

The person skilled in the art is moreover aware that the coupling reagent, usually a bifunctional organosilicon compound known from S. Wolff, "Chemical Aspects of Rubber Reinforcement by Fillers", Rubber Chem. Technol. 69, 325 (1996) is intended to modify the rubber-functional surface very homogeneously and quantitatively. The modification method can be precoating of the silica in bulk or in solution/suspension (ex-situ) (U. Görl, R. Panenka, Silanized silicas—A new class of materials for development of new mixtures [in German], Kautsch. Gummi Kunstst. 46, 538 (1993)) or else during the mixing process (in-situ) (H.-D. Luginsland, Processing of Silica/Silane-Filled Tread Compounds, paper No. 34 presented at the ACS Meeting, 4-6 Apr. 2000, Dallas, Tex./USA), in-situ modification being the preferable, and conventional process. In order to ensure rapid and quantitative silanization of the rubber-functional surface, it is therefore necessary to achieve a controlled increase in the concentration at the surface of reactive silanol groups, at which the coupling of the organosilicon compound can take place. The number of silanol groups can be quantified inter alia as Sears number $V_2$ (cf. R. K. Iler, The Chemistry of Silica, John Wiley & Sons (1979)). The interaggregate structure of silicas is usually determined by means of the DBP test (J. Behr, G. Schramm, Über die Bestimmung derÖlzahl a von Kautschuk-füllstoffen mit dem Brabender-Plastographen [Determination of oil number of rubber fillers using the Brabender Plastograph] Gummi Asbest Kunstst. 19, 912 (1966)). A high DBP number is needed in order to ensure ideal dispersion of the filler in the rubber. A moisture level >4% is needed in order to ensure rapid and complete silanization of the silica surface with an organosilicon compound (U. Görl, A. Hunsche, A. Müller, H. G. Koban, Investigations into the Silica/Silane Reaction System, Rubber Chem. Technol. 70, 608 (1997)). The moisture level is typically from 4 to 8%.

There are various processes known to the person skilled in the art for the production of silicas. For example, precipitations at constant pH have been described by EP 0937755. DE 10124298 has disclosed silicas precipitated with a constant excess of cations. EP 0755899 A2 and U.S. Pat. No. 4,001,379 have described precipitations at constant alkali number. Silicas for rubber applications are often produced with maintenance of a constant pH of from 7 to 10, see EP 0901986 A1 by way of example.

WO 2003016215 describes silicas which have a pore ratio of V(d5-d50)/V(d5-d100)>0.66. EP 0942029 in turn discloses silicas for elastomer mixtures which have two different types of aggregate.

SUMMARY OF THE INVENTION

It is an object of the present invention to provide precipitated silicas and a process for their production, the silicas being particularly efficiently suitable as reinforcing agents in elastomer mixtures. A further object is to provide a process for production of the silicas of the present invention.

Other objects not explicitly mentioned are apparent from the entire context of the description, examples and claims.

Surprisingly, it has been found that this object is achieved via the silicas of the present invention defined in more detail in the description below and also in the claims and in the examples.

DETAILED DESCRIPTION OF THE INVENTION

The present invention provides precipitated silicas characterized via the following physicochemical parameters:

| | |
|---|---|
| Relative breadth γ of pore size distribution | 4.0-10.0 (g nm)/ml, |
| BET surface area | 90-320 m²/g, |
| CTAB surface area | 100-200 m²/g, |
| Sears number $V_2$ | 25-40 ml/(5 g), |
| Sears number $V_2$/CTAB ratio | 0.16-0.28 ml/(5 m²). |

The Relative breadth γ of pore size distribution includes all values and subvalues therebetween, especially including 4.5, 5, 5.5, 6, 6.5, 7, 7.5, 8, 8.5, 9 and 9.5 (g nm)/ml.

The BET surface area includes all values and subvalues therebetween, especially including 100, 120, 140, 160, 180, 200, 220, 240, 260, 280 and 300 m²/g.

The CTAB surface area includes all values and subvalues therebetween, especially including 110, 120, 130, 140, 150, 160, 170, 180, and 190 m²/g.

The Sears number $V_2$ includes all values and subvalues therebetween, especially including 26, 28, 30, 32, 34, 36, 38 ml/(5g).

The Sears number $V_2$/CTAB ratio includes all values and subvalues therebetween, especially including 0.18, 0.2, 0.22, 0.24, 0.26 ml/(5m²).

The present invention also provides precipitated silicas which have, alongside the parameters mentioned, independently of one another, one or more of the following physicochemical parameters:

| | |
|---|---|
| BET/CTAB ratio | greater than 0.9 and smaller than 1.6, |
| Zeta potential at pH 5 | from −12 to −30 mV, |
| DBP number | from 200 to 330 g/(100 g), |
| Primary particle diameter | 10-40 nm, |
| $Al_2O_3$ content | <5% by weight, |
| Sieve residue (Ro-Tap, >300 μm) | ≧80% by weight, |
| Sieve fraction (Ro-Tap, <75 μm) | ≦10% by weight, |
| Carbon content | from 0.1 to 20.0% by weight | and which take the form of powders or take the form of approximately spherical particles (microgranulated materials) or of granulated materials.

The BET/CTAB ratio includes all values and subvalues therebetween, especially including 1, 1.1, 1.2, 1.3, 1.4, 1.5.

The zeta potential at pH 5 includes all values and subvalues therebetween, especially including 14, 16, 18, 20, 22, 24, 26, 28 mV.

The DBP number includes all values and subvalues therebetween, especially including 220, 240, 260 280, 300 and 320 g/(100 g).

The primary particle diameter includes all values and subvalues therebetween, especially including 12, 14, 16, 18, 20, 22, 24, 26, 28, 30, 32, 34, 36, 38 nm.

The carbon content includes all values and subvalues therebetween, especially including 0.5, 1, 2, 4, 6, 8, 10, 12, 14, 16 and 18% by weight.

The present invention also provides a process for production of the precipitated silicas of the present invention.

The present invention also provides the use of the silicas of the present invention in elastomer mixture, vulcanizable rubber mixture and/or another vulcanizate, for example a pneumatic or other tire, a tire tread, cable sheathing, a hose, a drive belt, a conveyor belt, a V-belt, a roller covering, a shoe sole, a gasket or a damping element.

The invention also provides an elastomer mixture, a vulcanizable rubber mixture, or any other vulcanizate, and also a tire, comprising the silicas of the present invention.

One of the advantages of the precipitated silicas of the present invention is that after their incorporation into rubber they bring about a low level of hysteresis, meaning that mechanic-dynamic loading of the mixture causes very little heat generation, an example of the consequence being low rolling resistance of a tire. Furthermore, a good dispersion coefficient and a high level of reinforcement is achieved, giving a very low tire abrasion value.

Broadened pore size distributions could hitherto only be achieved via mixtures of different silicas. In those mixtures, the particles of at least two different silicas were present alongside one another in the mixture. This has some attendant disadvantages. For example, firstly an additional mixing step has to be undertaken, and sufficient homogeneity of the mixture has to be ensured. No industrial relevance has hitherto attached to this type of process, therefore. With the precipitated silicas of the present invention, it has now become possible to achieve a particular relative breadth γ of the pore size distribution in a single type of silica particles. Because the precipitated silicas of the present invention are not a mixture of different particle types, it was possible to eliminate the abovementioned disadvantages. The silicas of the present invention therefore differ from the silicas described in EP 0942029.

Another advantage of the precipitated silicas of the present invention is the particularly high density of silanol groups. The sinalol groups on the silica surface in rubber mixtures function as possible chemical reaction partners for a coupling reagent. An example of this is a bifunctional silane, such as bis(3-triethoxysilylpropyl)tetrasulfane or bis(3-triethoxysilylpropyl)disulfane, which permits coupling of the silica to the rubber matrix. A maximum number of silanol groups therefore achieves high probability of coupling between silica and the coupling reagent and thus a high probability of coupling of the silica to the rubber matrix, and this finally leads to higher reinforcement potential.

Overall, the particular properties of the precipitated silicas of the present invention, and in particular here the high relative: breadth γ of the pore size distribution, the high density of silanol groups, the very low microporosity therefore lead to the following advantages by virtue of the pore size distribution, extremely low hysteresis loss after incorporation into elastomer mixtures and rubber mixtures, by virtue of the specific CTAB surface area values, a high level of reinforcement and improved abrasion performance in elastomer mixtures and rubber mixtures, good dispersion performance at the same time as good performance with regard to incorporation into the rubber.

Alongside the very low microporosity, the low zeta potential at pH 5 also contributes to advantageously high rubber activity and crosslinking density.

The subject matters of the invention are described in detail below.

The terms silica and precipitated silica are used synonymously in the present invention.

The silicas of the present invention have broad pore size distribution of the pores with a pore diameter smaller than that of the maximum of the derivative of the pore volume distribution function, which is determined by means of mercury porosimetry. Because there are various available forms of silicas—e.g. powders, spherical particles or granulated materials —mechanical pressure-treatment of the silica has to take place in order to obtain a measured value independent of the available form.

The pore volume determined by mercury porosimetry in the range from 3.5 nm to 5 μm is then evaluated. For this, an algorithm is applied to the data of the negative logarithmic derivative of cumulative pore volume, and first determines the most frequent, characteristic pore diameter. This is typically in the range from 10 to 100 nm. Starting from that value, further evaluation takes place as stated in the experimental section. The result is a relative breadth γ of the pore size distribution which takes into account asymmetric pore size distributions. The relative breadth γ is therefore a characteristic feature which can be determined with good reproducibility and which is independent of the available form and which describes only the pores whose diameter is smaller than that of the most frequent pores (cf. FIG. 1). This pore size range corresponds mainly to the pore volume between the primary particles which have accreted to give silica aggregates, and permits a conclusion to be drawn concerning their aggregation. The relative breadth γ of the pore size distribution brings about a low level of hysteresis after incorporation of the precipitated silicas into rubber, inter alia, and thus ensures that a tire has low rolling resistance. The relative breadth γ of the pore size distribution is in the range from 4.0 to 10.0 (g nm)/ml, preferably from 4.3 to 8.5 (g nm)/ml and particularly preferably from 4.5 to 8.5 (g nm)/ml, or else from 4.5 to 7.5 (g nm)/ml.

The precipitated silicas of the present invention moreover have a high absolute Sears number $V_2$. The Sears number $V_2$ is a measure that can describe the number of silanol groups of the silica. The Sears number $V_2$ of the silicas of the present invention is preferably in the range from 26 to 40 ml/(5 g), particularly preferably from 26 to 36 ml/(5 g) and very particularly preferably from 26 to 33 ml/(5 g), or else from 27 to 31 ml/(5 g).

However, the statement of the absolute number of silanol groups alone is not always suitable for adequate characterization of a precipitated silica, because precipitated silicas with high surface area generally have a higher absolute number of silanol groups than precipitated silicas with a low surface area. The Sears number $V_2$ therefore has to be related to the surface area of the silica. For the application of the present invention, the CTAB surface area is to be regarded as more important than the BET surface area, because it is a measure of the surface area accessible from outside and therefore available for crosslinking with the rubber system. The quotient Sears number $V_2$/CTAB is therefore important. This is therefore a method of representing the reinforcement potential generated via the silanol groups per unit of external surface area introduced and therefore per unit of specific surface area accessible to the coupling partner. A feature of the silicas of the present invention is a markedly increased ratio of the Sears number $V_2$ to the CTAB surface area, of from 0.16 to 0.28 ml/(5 m$^2$), when comparison is made with known precipitated silicas. This means that the precipitated silicas of the present invention have a very large number of silanol groups, in particular in relation to the external surface area. The ratio of the Sears number $V_2$ to the CTAB surface area is preferably in the range from 0.16 to 0.26 ml/(5 m$^2$) and particularly preferably from 0.16 to 0.25 ml/(5 m$^2$), very particularly preferably from 0.17 to 0.24 ml/(5 m$^2$) and from 0.19 to 0.24 ml/(5 m$^2$).

The specific CTAB surface area is of prime decisive importance for the reinforcing property of the silica (cf. Janzen, Kraus, Rubber Chem. Technol. 44, 1287 (1971)). The reinforcement potential increases with increasing CTAB surface area. A feature of the precipitated silicas of the present invention is therefore a CTAB surface area of from 100 to 200 m$^2$/g, preferably from 105 to 195 m$^2$/g, particularly preferably from 110 to 190 m$^2$/g and very particularly preferably from 110 to 180 m$^2$/g, or else from 110 to 175 m$^2$/g. In one particular embodiment, the CTAB surface area is in the range from 100 to 139 m$^2$/g and preferably in the range from 105 to 134 m$^2$/g. In another particular embodiment, the precipitated silicas of the present invention have a CTAB surface area of from 141 to 200 m$^2$/g and preferably from 145 to 190 m$^2$/g and from 145 to 175 m$^2$/g.

The specific BET surface area describes the effect of the silica on performance during incorporation into the rubber, the properties of the crude mixture, and also the vulcanization kinetics (cf. S. Brunauer, P. H. Emmett, E. Teller, "Adsorption of Gases in Multimolecular Layers", J. Am. Chem. Soc. 60, 309 (1938)). A feature of the silicas of the present invention is therefore a BET surface area of from 90 to 320 m$^2$/g, preferably from 100 to 250 m$^2$/g, particularly preferably from 105 to 220 m$^2$/g, or else from 105 to 160 m$^2$/g and from 105 to 135 m$^2$/g. In one particular embodiment, a feature of the silicas of the present invention is a BET surface area of from 125 to 250 m$^2$/g, preferably from 141 to 240 m$^2$/g and particularly from 155 to 220 m$^2$/g.

Further information on surface activity and also the coupling power of the coupling reagent to the silica, and also on the polymer/silica interaction is obtained via determination of the zeta potential. The method here detects the sound waves emitted from an aqueous suspension of the silica at a prescribed pH in a high-frequency electrical field. These are produced by virtue of the surface charges on the silica and therefore represent a measure, for the coupling reaction, of the dissociated silanol groups available for a reaction. The silicas of the present invention can advantageously have a zeta potential at pH 5 of from −12 to −30 mV. The zeta potential is preferably from −12 to −25 mV, particularly preferably from −13 to −21 mV.

It has moreover been found that high DBP absorption of the silicas of the present invention is useful for achieving good dispersion. However, a factor to be taken into account here is that the DBP number is reduced by any granulation process carried out, and therefore it is permissible only to compare silicas within one available form. The silicas of the present invention can have a DBP number from 200 to 330 g/(100 g). The DBP number is preferably from 250 to 330 g/(100 g) for powders and spherical particles (microgranulated materials) or else from 200 to 260 g/(100 g) for granulated materials.

Alongside the relative breadth γ of the pore size distribution, another criterion of the silicas of the present invention is the nature of the pores, i.e. whether they are accessible to the rubber or not. The nature of the pores is described via the BET/CTAB quotient. A high BET/CTAB quotient shows microporosity and therefore a high proportion of "internal" surface-accessible by way of example to the small nitrogen molecule but not to rubber. The BET/CTAB ratio of the silicas of the present invention is in the range from 0.90 to less than or equal to 1.60, preferably from 1.08 to 1.50, particularly preferably in the range from 1.10 to 1.40, very particularly preferably in the range from 1.10 to 1.30 and with particular preference in the range from 1.12 to 1.25.

The silicas of the present invention can have an aluminum oxide content of from 0.001 to 5% by weight, preferably from 0.001 to 0.5% by weight, particularly preferably from 0.01 to 0.3% by weight and very particularly from 0.01 to 0.15% by weight. The aluminum oxide content includes all values and subvalues therebetween, especially including 0.005, 0.01, 0.05, 0.1, 0.5, 1, 1.5, 2, 2.5, 3, 3.5, 4, 4.5% by weight.

The precipitated silicas of the present invention can be present in various available forms, for example in the form of a powder whose $d_{50}$ particle size determined by means of laser scattering is from 1 to 80 μm. The pulverulent particles can have an irregular, or else a regular, external shape, meaning that they can by way of example also be in essence spherical. The precipitated silicas of the present invention can also take the form of particles (microgranulated materials) which are in essence spherical whose particle size $d_{50}$ determined by means of sieve residue determination (Alpine) is from 80 μm to 1000 μm. In the last-mentioned instance, the silicas of the present invention are preferably produced by means of spray tower drying, as described in EP 0937755, and exhibit an external shape characteristic of this method of drying (see figures in EP 0937755). The content of EP 0937755 is hereby expressly incorporated by way of reference into the content of the present application. If the precipitated silicas of the present invention take the form of granulated materials ($d_{50}$>1000 μm (Alpine sieve residue)), their particle size distribution after granulation is preferably such that the size of at least 80% by weight of the particles is greater than 300 μm and that of at most 10% by weight are smaller than 75 μm, by means of sieve-residue determination (Ro-Tap).

The preferred ranges mentioned can be set independently of one another.

The present invention also provides a process for production of the silicas of the present invention, encompassing the following steps:
a) using, as initial charge, an aqueous solution of an alkali metal silicate and/or alkaline earth metal silicate and/or an organic and/or inorganic base, the alkali number of the initial charge being from 20 to 40,
b) simultaneous feed of alkali metal silicate and/or of alkaline earth metal silicate and of acidifier into this initial charge with stirring at from 55 to 85° C. until viscosity rises,
c) interruption of the feed for from 35 to 85 minutes, preferably while maintaining the temperature reached at the end of stage b),
d) further simultaneous feed of alkali metal silicate and/or of alkaline earth metal silicate and of acidifier at a temperature of from 55 to 85° C., preferably at a temperature the same as that at the end of stage b) or c), until a solids content of from 90 to 140 g/l has been reached,
g) continued stirring of the resultant suspension for from 1 to 120 minutes at from 80 to 98° C.,
h) acidification with an acidifier to a pH of from 2.5 to 5.0 and
i) filtration and drying.

The viscosity rise point here corresponds to the juncture at which a marked rise starts to occur in the viscosity of the precipitation suspension during the course of precipitation, in which connection cf. EP 0643015.

It is preferable that in at least one of the steps a) to h), preferably in at least one of the steps b) to h), particularly preferably in the steps b) to h), the precipitation suspension is subjected to severe shear by means of an additional shear assembly. It is preferable that in the steps b) and d) the sulfuric acid is metered directly onto the shear head of the additional shear assembly, in such a way as immediately to produce intensive incorporation of the acid by mixing into the precipitated suspension, and thus very homogeneous and rapid dispersion.

The initial charge can amount to about 20, 30, 40, 50, 60, 70, 80 or 90% of the final precipitation volume. The basic compounds added to the initial charge have in particular been selected from the group of the alkali metal hydroxides, alkaline earth metal hydroxides, alkali metal carbonates, alkali metal hydrogencarbonates and alkali metal silicates. Waterglass and/or sodium hydroxide solution are preferred.

Sulfuric acid is preferably used as acidifier. However, it is also possible to use other acidifiers, such as HCl, $HNO_3$, $H_3PO_4$ or $CO_2$.

The alkali metal silicate or alkaline earth metal silicate used is preferably waterglass (sodium silicate solution with modulus of from 2.0 to 3.5 by weight) and/or other silicates, such as potassium silicate or calcium silicate. It is particularly preferable to use waterglass whose modulus is from 3.2 to 3.5 by weight and whose density is from 1.30 to 1.45 kg/l.

The alkali number set in the initial charge (step a) and the alkali number during steps b) and/or d) is from 20 to 40, preferably from 20 to 35, particularly preferably from 25 to 35.

The preferred manner of addition of the alkali metal silicate and/or alkaline earth metal silicate and of the acidifier during step b) and/or d) is that the alkali number of the reaction solution is kept constant during the respective precipitation step. "Constant" means that the alkali number can deviate from the specified value by at most 2% during the respective precipitation step.

Each of the components added in steps b) and d) can have identical or different concentrations and/or inflow rates. In one process variant, the concentration of the components used in both steps is identical, but the inflow rate of the components in step d) is greater than in step b). It is particularly preferable that the inflow rate of the components in step d) is from 125 to 140% of the inflow rate in step b).

Following step d) in the process of the present invention the addition of alkali metal silicate and/or of alkaline earth metal silicate is stopped and, if appropriate, in step
e) addition of an acidifier is continued with identical or altered rate, until a pH of from 3 to 11, preferably from 5 to 11 and particularly preferably from 7 to 10, has been reached.

In order to vary the concentration of the alkali metal silicate and/or alkaline earth metal silicate available for the reaction, it is possible, if appropriate, in step
f) to raise the pH again to values of from 8 to 14, preferably from 8 to 11 and particularly from 9 to 10, via feed of one or more basic compounds from the group of the alkali metal hydroxides, alkaline earth metal hydroxides, alkali metal carbonates, alkali metal hydrogencarbonates and alkali metal silicates. Waterglass and/or sodium hydroxide are preferred.

The feed of the acidifier in step e) and, respectively, of the basic compound in step f) can take place at from 40 to 98° C. The feed preferably takes place at from 55 to 95° C., and particularly preferably at the temperature also selected for the steps b) or d).

Furthermore, additional addition of organic or inorganic salts can optionally take place during steps a) to h). This can be carried out in solution or in the form of a solid, in each case continuously over the addition time of the alkali metal silicate and/or alkaline earth metal silicate and of the acidifier, or in the form of a batch addition. It is also possible to dissolve the salts in one or both components and then add them together with these.

Step e) is preferably executed in two stages. The inflow rate of the acidifier in the first substep is preferably from 90 to 110% and in the second substep is preferably from 40 to 60% of the inflow rate of step d).

Alkali metal salts or alkaline earth metal salts are preferably used as inorganic salts. In particular, it is possible to use any combination of the following ions:
$Li^+$, $Na^+$, $K^+$, $Rb^+$, $Be^{2+}$, $Mg^{2+}$, $Ca^{2+}$, $Sr^{2+}$, $Ba^{2+}$, $H^+$, $F^-$, $Cl^-$, $Br^-$, $I^-$, $SO_3^{2-}$, $SO_4^{2-}$, $PO_3^{3-}$, $PO_4^{3-}$, $NO_3^-$, $NO_2^-$, $CO_3^{2-}$, $OH^-$, $TiO_3^{2-}$, $ZrO_3^{2-}$, $ZrO_4^{4-}$, $AlO_2^-$, $Al_2O_4^{2-}$, $BO_4^{3-}$.

Suitable organic salts are the salts of formic, acetic and propionic acid. A cation which may be mentioned is the alkali metal ions or alkaline earth metal ions. The concentration of these salts in the addition solution can be from 0.01 to 5 mol/l. $Na_2SO_4$ is preferably used as inorganic salt.

Filtering of the silicas of the present invention and their conversion to a liquid form (e.g. according to DE 2447613) and their drying over a long or short period are familiar to the person skilled in the art and can by way of example be found in the documents mentioned in the description. The manner of filtering and washing of the silica is preferably such that the conductivity of the final product is <2000 μS/cm and particularly <1300 μS/cm.

The silica of the present invention is preferably dried in a pneumatic dryer, spray dryer, staged dryer, belt dryer, rotating-tube dryer, flash dryer, spin-flash dryer or spray tower dryer. These drying variants include operation with an atomizer, with a single- or twin-fluid nozzle or with an integrated fluidized bed. By way of example, the spray drying can be carried out according to U.S. Pat. No. 4,094,771. A spray tower drying process can by way of example be carried out as described in EP 0937755. The average diameters of the spray-dried particles can be above 15 µm, preferably from 15 to 80 µm, measured by means of laser scattering. The spray-tower-dried particles preferably have average particle sizes, measured by means of sieve analysis (Alpine) above 80 µm, in particular above 90 µm, preferably above 200 µm. The content of U.S. Pat. No. 4,094,771 and of EP 0 937755 is hereby explicitly incorporated by way of reference into the present application.

A WP 50N/75 roll compactor from Alexanderwerk AG, Remscheid, Germany can by way of example be used for the granulation process.

It is preferable that the pulverulent product here is deaerated by way of a horizontal feed system with single screw, via a vacuum system, without further addition of binders or liquids, and simultaneously introduced uniformly between the bilaterally mounted vertically arranged rolls. The powder is pressed to give a crust and converted by means of a breaker to give granulated material of the desired maximum size.

The silica of the present invention can optionally be modified with linear, cyclic and/or branched silanes, silazanes, siloxane compounds and/or organosilicon compounds. By way of example, the substituents can be composed of —SCN, —SH, —Cl, —NH$_2$, —OC(O)CH=CH$_2$, —OC(O)C(CH$_3$)=CH$_2$, —S, —S$_2$, —S$_3$, —S$_4$, or of aliphatics, of olefins, of aromatics, or of arylaromatics, with or without hydroxy radicals, amino radicals, alkoxy radicals, silanol radicals, cyanide radicals, thiocyanide radicals, halogen radicals, sulfonic acid radicals, sulfonic ester radicals, thiol radicals, benzoic acid radicals, benzoic ester radicals, carboxylic acid radicals, carboxylic ester radicals, acrylate radicals, methacrylate radicals and/or organosilane radicals.

It is preferable to use bifunctional silanes which firstly permit coupling to the filler containing silanol groups and second permit coupling to the polymer. Examples of these organosilicon compounds are:

bis(3-triethoxysilylpropyl)tetrasulfane, bis(3-triethoxysilylpropyl)disulfane, vinyltrimethoxysilane, vinyltriethoxysilane, 3-mercaptopropyltrimethoxysilane, 3-mercaptopropyltriethoxysilane, 3-aminopropyltrimethoxysilane, 3-aminopropyltriethoxysilane. Other organosilicon compounds have been described in WO 99/09036, DE 10163945 and DE 10223658. The content of the patent specifications mentioned is hereby explicitly incorporated by way of reference into the content of the present application. In one preferred embodiment of the invention, bis(3-triethoxysilylpropyl)tetrasulfane or bis(3-triethoxysilylpropyl)disulfane can be used as silane.

The optionally granulated, ungranulated, milled and/or unmilled precipitated silica can be modified with one or more of the compounds mentioned in mixtures of from 0.5 to 50 parts, based on 100 parts of precipitated silica, in particular from 1 to 15 parts and very particularly from 1 to 10 parts, based on 100 parts of precipitated silica, and the reaction between precipitated silica and the compounds mentioned can be carried out during preparation of the mixture (in situ) or externally via spray application and subsequent heat-conditioning of the mixture, via mixing of the modifier and of the silica suspension with subsequent drying and heat-conditioning (e.g. according to DE 3437473 and DE 19609619) or according to the process described in DE 19609619 or DE 4004781.

The carbon content of the modified silica is from 0.1 to 20% by weight, preferably from 0.1 to 10% by weight and particularly preferably from 0.5 to 5% by weight.

The present invention also provides the use of silicas in elastomer mixtures, in vulcanizable rubber mixtures and/or in other vulcanizates, such as pneumatic or other tires, tire treads, cable sheathing, hoses, drive belts, conveyor belts, V-belts, roll coverings, shoe soles, gaskets and damping elements.

The silica of the present invention can be incorporated by mixing in elastomer mixtures, in tires or in vulcanizable rubber mixtures as reinforcing filler in amounts of from 5 to 200 parts, based on 100 parts of rubber, in the form of powder, spherical product or granulated materials, either with or without organic post-treatment.

For the purposes of the present invention, rubber mixtures and elastomer mixtures are to be regarded as equivalent.

The elastomer mixtures or rubber mixtures may also have been filled with one or more fillers of relatively high or relatively low reinforcing character, alongside mixtures which comprise exclusively the silica of the present invention as fillers, with or without the organic post-treatment mentioned.

The following materials can be used as other fillers:

Carbon blacks: the carbon blacks to be used here are produced by the flame black process, furnace black process or gas black process and have BET surface areas of from 20 to 200 m$^2$/g, examples being SAF carbon blacks, ISAF carbon blacks, HSAF carbon blacks, HAF carbon blacks, FEF carbon blacks or GPF carbon blacks. The carbon blacks can, if appropriate, also comprise heteroatoms, such as silicon.

Fine-particle fumed silicas, produced by way of example via flame hydrolysis such as silicon halides. The silicas can also, if appropriate, be present in the form of mixed oxides with other metal oxides, such as Al oxides, Mg oxides, Ca oxides, Ba oxides, Zn oxides and titanium oxides.

Other commercially available silicas

Synthetic silicates, such as aluminum silicate, alkaline earth metal silicates such as magnesium silicate or calcium silicate, with BET surface areas of from 20 to 400 m$^2$/g and with primary particle diameters of from 10 to 400 nm Synthetic or naturally occurring aluminum oxides and synthetic or naturally occurring aluminum hydroxides Naturally occurring silicates, such as kaolin, and other naturally occurring silicon dioxide compounds Glass fiber and glass fiber products (mats, strands) or glass microbeads Starch and modified grades of starch Naturally occurring fillers, e.g. clays and silaceous chalk.

The blending ratio here again depends on the property profile to be achieved in the finished rubber mixture. A ratio of from 5 to 95% between the silicas of the present invention and the other abovementioned fillers (also in the form of a mixture) is conceivable and is also realized in this context.

In one particularly preferred embodiment, from 10 to 150 parts by weight of silicas, composed entirely or to some extent of the silica of the present invention, and also from 1 to 10 parts by weight of an organosilicon compound, can be used for production of the mixtures, if appropriate together with from 0 to 100 parts by weight of carbon black, based in each case on 100 parts by weight of rubber.

The elastomers form another important constituent of the rubber mixture, alongside the silicas of the present invention, the organosilanes and other fillers. Mention may be made here of elastomers which are natural or synthetic, oil-extended or not, in the form of an individual polymer or a blend with other rubbers, examples being natural rubbers, polybutadiene (BR), polyisoprene (IR), styrene-butadiene copolymers with styrene contents of from 1 to 60% by weight, preferably from 2 to 50% by weight (SBR) in particular produced by means of the solution polymerization process, butyl rubbers, isobutylene-isoprene copolymers (IIR), butadiene-acrylonitrile copolymers with acrylonitrile contents of from 5 to 60% by weight, preferably from 10 to 50% by weight (NBR), partially hydrogenated or fully hydrogenated NBR rubber (HNBR), ethylene-propylene-diene copolymers (EPDM), and mixtures of these rubbers.

The following additional rubbers can also be used for rubber mixtures with the rubbers mentioned: carboxy rubbers, epoxy rubbers, trans-polypentenamer, halogenated butyl rubbers, rubbers derived from 2-chlorobutadiene, ethylene-vinyl acetate copolymers, ethylene-propylene copolymers, and, if appropriate, chemical derivatives of natural rubber and modified natural rubbers.

Preferred synthetic rubbers are described by way of example in W. Hofinann, Kautschuktechnologie [Rubber Technology], Genter Verlag, Stuttgart, Germany, 1980.

For production of the tires of the present invention, anionically polymerized S-SBR rubbers (solution SBR) whose glass transition temperature is above −50° C. are of particular interest, as also are mixtures of these with diene rubbers.

The method of incorporation of this silica and of production of the mixtures comprising this silica is the usual rubber industry method, in an internal mixer or on a roll mill, preferably at from 80 to 200° C. The available form or usage form of the silicas can be either powder, spherical product or granulated material.

The rubber vulcanizates of the present invention can comprise the usual added amounts of other rubber auxiliaries, examples being reaction accelerators, antioxidants, heat stabilizers, light stabilizers, ozone stabilizers, processing aids, plasticizers, tackifiers, blowing agents, dyes, pigments, waxes, extenders, organic acids, retarders, metal oxides, and also activators, such as triethanolamine, polyethylene glycol and/or hexanetriol. These compounds are known in the rubber industry.

The amounts of the rubber auxiliaries used can be the known amounts, depending inter alia on the intended use. Examples of conventional amounts are amounts of from 0.1 to 50% by weight, based on rubber. Sulfur or sulfur-donating substances can be used as crosslinking agents. The rubber mixtures of the present invention can moreover comprise vulcanization accelerators. Examples of suitable main accelerators are mercaptobenzothiazols, sulfenamides, thiurams, and dithiocarbamates in amounts of from 0.5 to 3% by weight. Examples of co-accelerators are guanidines, thioureas and thiocarbonates in amounts of from 0.5 to 5% by weight. The amounts of sulfur that can usually be used are from 0.1 to 10% by weight, preferably from 1 to 3% by weight, based on rubber.

The silicas of the present invention can be used in rubbers which are crosslinkable with accelerators and/or sulfur, or are peroxidically crosslinkable.

The rubber mixtures of the present invention can be vulcanized at temperatures of from 100 to 200° C., preferably from 130 to 180° C., if appropriate under pressure of from 10 to 200 bar. The blending of the rubbers with the filler, and if appropriate with rubber auxiliaries and with the organosilicon compound can be carried out in known mixing assemblies, such as rolls, internal mixers and mixing extruders.

The rubber mixtures of the present invention are suitable for production of moldings, e.g. for production of pneumatic tires, of tire treads for summer tires, winter tires and all-year-round tires, car tires, tires for utility vehicles, motorcycle tires, tire subcomponents, cable sheathing, hoses, drive belts, conveyor belts, roll coverings, shoe soles, gasket rings and damping elements.

The rubber mixtures of the present invention are particularly suitable for production of car tire treads and of motorcycle tire treads, but also for tires for utility vehicles with reduced rolling resistance together with good abrasion resistance and good winter performance.

The rubber mixtures of the present invention are moreover suitable without addition of organosilicon compounds in a blend with a typical tire-tread carbon black for improvement of the Cut & Chip performance of tires for construction machinery, tires for agricultural machinery and tires for mining machinery. (For definition and further details, see "New insights into the tear mechanism" and references therein, presented by Dr. W. Niedermeier at Tire Technology 2003 in Hamburg, Germany).

The reaction conditions and the physicochemical data for the precipitated silicas of the present invention are determined by the following methods:

Determination of Solids Content of Filter Cake

This method is used to determine solids content of filter cake via removal of volatile content at 105° C.

To this end, 100.00 g of the filter cake are weighed (starting weight E) into a dry, tared porcelain dish (diameter 20 cm). If appropriate, the filter cake is comminuted with a spatula in order to obtain a free-flowing crumb material whose dimensions are at most 1 cm$^3$. The specimen is dried to constant weight in a drying cabinet at 105±2° C. The specimen is then cooled to room temperature in a desiccator cabinet with silica gel as desiccant. The final weight A is determined gravimetrically.

Solids content (SC) is determined in % as follows:

$$SC = A/E * 100\%,$$

where A=final weight in g and E=starting weight in g.

Determination of Solids Content of Precipitation Suspensions

The solids content of the precipitation suspension is determined gravimetrically after filtration of the specimen.

100.0 ml of the homogenized precipitation suspension ($V_{suspension}$) are measured out at room temperature with the aid of a measuring cylinder. The specimen is filtered off with suction by way of a round filter (Schleicher & Schuell 572) in a porcelain suction filter funnel, but not sucked dry, thus preventing cracking of the filter cake. The filter cake is then washed with 100.0 ml of distilled water. The washed filter cake is transferred to a tared porcelain dish and dried to constant weight in a drying cabinet at 105±2° C. The weight of the dried silica ($m_{specimen}$) is determined after cooling to room temperature.

Solids content is determined as follows:

$$\text{Solids content in g/l} = (m_{specimen} \text{ in g})/(V_{suspension} \text{ in } l).$$

Determination of Solids Content of Silica Feed

The silica feed is dried to constant weight in an IR dryer. The loss on drying is composed mainly of aqueous moisture.

2.0 g of silica feed are placed in a tared aluminum dish, and the lid of the IR drying unit (Mettler, LP 16) is closed. Once the start button has been pressed, drying of the suspension at 105° C. begins, and is automatically terminated when the loss in weight per unit of time becomes less than 2 mg/(120 s).

Loss in weight in % is directly displayed by the device on selection of 0-100% mode. Solids content is calculated as follows:

Solids content in % = 100% − loss in weight in %.

Determination of Alkali Number

Alkali number describes the consumption of hydrochloric acid in ml (for 50 ml of specimen volume, 50 ml of distilled water and concentration 0.5 mol/l for the hydrochloric acid used) on direct potentiometric titration of alkaline solutions or suspensions to pH 8.30. This procedure detects the free alkali content of the solution or suspension.

The pH device (Knick 766 Calimatic pH meter with temperature sensor) and the pH electrode (Schott, N7680 combination electrode) are calibrated with the aid of two buffer solutions (pH=7.00 and pH=10.00) at room temperature. The combination electrode is immersed in the test solution or test suspension which is temperature-controlled to 40° C. and which is composed of 50.0 ml of precipitation suspension and 50.0 ml of deionized water. Hydrochloric acid solution whose concentration is 0.5 mol/l is then added dropwise to this mixture until the pH is constant at 8.30. Because the equilibrium between the silica and the free alkali content becomes established only slowly, a waiting time of 15 min is needed prior to final read-off of acid consumption. Given the selected amounts of substances and concentrations, the hydrochloric acid consumption read off in ml is directly equal to the alkali number, which is stated without dimensions.

pH Determination

The pH of the silica is determined on a 5% strength aqueous suspension at room temperature by a method based on DIN EN ISO 787-9. The starting weights were altered from the specifications of that standard (5.00 g of silica for 100 ml of deionized water).

Determination of Electrical Conductivity

Electrical conductivity of silica was determined on a 4% strength aqueous suspension at room temperature by a method based on DIN EN ISO 787-14. The starting weights were altered from the specifications in that standard (4.00 g of silica for 100 ml of deionized water).

Moisture Determination

Silica moisture is determined to ISO 787-2 after 2 hours of drying in a drying cabinet with air circulation at 105° C. This loss on drying is composed mainly of aqueous moisture.

BET Surface Area Determination

Specific nitrogen surface area (hereinafter termed BET surface area) of the pulverulent, spherical or granular silica is determined to ISO 5794-1/Annex D, using an AREA-meter (Ströhlein, JUWE).

CTAB Surface Area Determination

The method is based on adsorption of CTAB (N-hexadecyl-N,N,N-trimethylammonium bromide) on the "external" surface of the silica by a method based on ASTM 3765 or NFT 45-007 (section 5.12.1.3).

Adsorption of CTAB takes place in aqueous solution with stirring and ultrasound treatment. Excess CTAB not adsorbed is determined via back-titration with NDSS (sodium dioctyl sulfosuccinate solution, "Aerosol OT" solution), using a titroprocessor, the end point being given via the maximum of cloudiness of the solution and being determined by a phototrode. The temperature during all of the operations carried out is from 23 to 25° C. in order to prevent CTAB from crystallizing out. The following reaction equation underlies the back-titration process:

Equipment

METTLER Toledo DL 55 titroprocessor and METTLER Toledo DL 70 titroprocessor, in each case equipped with:
Mettler DG 111 pH electrode and Mettler, DP 550 phototrode
100 ml polypropylene titration beaker
150 ml glass titration vessel with lid
Pressure filtration device, capacity 100 ml
Membrane filter composed of cellulose nitrate, pore size 0.1 μm, Ø 47 mm, e.g. Whatman (Catalog. No. 7181-004)

Reagents

The solutions of CTAB ($C_{CTAB}$=0.015 mol/l in deionized water) and NDSS (concentration=0.00423 mol/l in deionized water) are purchased in ready-to-use form (Bernd Kraft GmbH, 47167 Duisburg: Catalog No. 6056.4700 CTAB solution, concentration 0.015 mol/l; Catalog No. 6057.4700 NDSS solution 0.00423 mol/l), and were stored at 25° C. and used within one month.

Method

1. Blind Titration

Consumption of NDSS solution for titration of 5 ml of CTAB solution is to be checked once daily prior to each series of tests. To this end, prior to start of the titration process, the phototrode is adjusted to 1000±20 mV (corresponding to 100% transparency). Exactly 5.00 ml of CTAB solution are pipetted into a titration beaker, and 50.0 ml of deionized water are added. Titration with NDSS solution is carried out with stirring by the test method familiar to the person skilled in the art, using the DL 55 titroprocessor, as far as max. cloudiness of the solution. Consumption $V_A$ of NDSS solution in ml is determined. Each titration is to be carried out three times.

2. Adsorption 10.0 g of the pulverulent, spherical or granulated silica with moisture content of 5±2% (moisture content being adjusted, if appropriate via drying at 105° C. in a drying cabinet or uniform moistening) are comminuted for 30 seconds, using a mill (Krups KM 75, product No. 2030-70). Exactly 500.0 mg of the comminuted specimen (starting weight E) are transferred to a 150 ml titration vessel with magnetic stirrer rod, and exactly 100.0 ml of CTAB solution ($T_1$) are added. The titration vessel is sealed with a lid and the mixture is stirred by an Ultra-Turrax T 25 stirrer (KV-18G stirrer shaft, diameter 18 mm) at 18,000 rpm for at most 1 min until the material is completely wetted. The titration vessel is attached to the DL 70 titroprocessor by the screw thread, and the pH of the suspension is adjusted with KOH (0.1 mol/l) to a value of 9±0.05.

The suspension is then treated with ultrasound for 4 minutes in the titration vessel in an ultrasound bath (Bandelin, Sonorex RK 106 S, 35 kHz, 100 W Effective and 200 W maximum power) at 25° C. A membrane filter with nitrogen pressure of 1.2 bar is then used for immediate pressure filtration. 5 ml of foreruns are discarded.

3. Titration 5.00 ml of the remaining filtrate are pipetted into a 100 ml titration beaker and made up to 50.00 ml with deionized water. The titration beaker is attached by the screw thread to the DL 55 titroprocessor, and the titration with NDSS solution takes place with stirring until maximum cloudiness is reached. Consumption $V_B$ of NDSS solution in ml is determined. Each titration is to be carried out three times.

Calculation $$CTAB \text{ (not corrected for moisture level)} = \frac{V_A - V_B}{V_A} \cdot \frac{C_{CTAB} * M_{CTAB} * T_1 * P}{E}$$

$V_A$=consumption of NDSS solution in ml during titration of blind specimen
$V_B$=consumption of NDSS solution in ml on using filtrate
$C_{CTAB}$=concentration of CTAB solution in mol/l
$M_{CTAB}$=molar mass of CTAB=364.46 g/mol
$T_1$=amount of CTAB solution added in l
P=volume occupied by CTAB=578.435 m²/g
E=starting weight of silica
CTAB surface area is based on the anhydrous silica, and the following correction is therefore carried out:

$$CTAB = \frac{CTAB \text{ (not corrected for moisture level) in m}^2/g * 100\%}{100\% - \text{moisture level in }\%}$$

The moisture level of the silica is determined by the "Moisture determination" method described.

Determination of DBP Absorption

DBP absorption (DBP number) is determined as follows by a method based on the DIN 53601 standard, and is a measure of the absorbency of the precipitated silica:

12.50 g of pulverulent or spherical silica with from 0 to 10% moisture content (moisture content being adjusted if appropriate via drying at 105° C. in a drying cabinet) are added to the kneading chamber (product number 279061) of a Brabender "E" Absorptometer (without damping of the output filter of the torque sensor). In the case of granulated materials, the sieve fraction from 1 to 3.15 mm (Retsch stainless steel sieve) is used (via gentle pressing of the granulated materials by a plastics spatula through the sieve with pore width 3.15 mm). Dibutyl phthalate is added dropwise with a dosing rate of 4 ml/min at room temperature via a "Brabender T 90/50 Dosimat" into the mixture, with continuous mixing (rotation rate of kneader blades: 125 rpm). Only very little force is needed for the mixing-incorporation process, which is followed by using the digital display. Toward the end of the determination, the mixture becomes pasty, and this is indicated by means of a steep rise in force required. When the display shows 600 digits (torque 0.6 Nm) the kneader and the DBP metering are both switched off via an electrical contact. The synchronous motor for DBP input has coupling to a digital counter, and DBP consumption in ml can therefore be read off. DBP absorption is stated in g/(100 g) and calculated using the following formula:

$$DBP = \frac{V * D * 100}{E} * \frac{g}{100\,g} + K$$

where
DBP=DBP absorption in g/(100 g)
V=DBP consumption in ml
D=DBP density in g/ml (1.047 g/ml at 20° C.)

E=starting weight of silica in g
K=correction value as in moisture correction table in g/(100 g)

DBP absorption is defined for the anhydrous, dried silica. If moist precipitated silicas are used, the correction value K has to be taken into account for calculation of DBP absorption. This value can be determined by using the following correction table, and for example silica water content of 5.8% would mean an added value of 33 g/(100 g) for DBP absorption. The moisture level of the silica is determined as in the method for "Determination of moisture level or loss on drying".

Moisture correction table for dibutyl phthalate absorption (anhydrous)

| % moisture level | .% moisture level | | | | |
|---|---|---|---|---|---|
| | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Sears Number Determination

The modified Sears number (hereinafter Sears number $V_2$) is a measure of the number of free silanol groups and can be determined via titration of silica with potassium hydroxide solution in the range from pH 6 to pH 9.

The determination method is based on the following chemical reactions, and ≡SiOH is intended to symbolize a silanol group of the silica:

≡SiOH+NaCl⇌≡SiONa+HCl

HCl+KOH⇨KCl+H₂O.

Method 10.00 g of a pulverulent, spherical or granular silica with moisture level of 5±1% are uniformly comminuted for 60 seconds, using an IKA M 20 universal mill (550 W; 20 000 rpm). If appropriate, the moisture content of the starting substance has to be adjusted via drying at 105° C. in a drying cabinet, or uniform wetting, and the comminution process repeated. 2.50 g of the resultant treated silica are weighed out at room temperature into a 250 ml titration vessel and mixed with 60.0 ml of methanol (analytical grade). Once the specimen has been completely wetted, 40.0 ml of deionized water are added, and an Ultra-Turrax T 25 stirrer (KV-18G stirrer shaft, diameter 18 mm) is used for dispersion for 30 seconds with rotation rate 18,000 rpm. 100 ml of deionized water are used to flush the specimen particles adhering to the edge of the vessel and to the stirrer into the suspension, and the temperature of the mixture is controlled to 25° C. in a water-bath with thermostat.

The pH measurement device (Knick 766 Calimatic pH meter with temperature sensor) and the pH electrode (Schott N7680 combination electrode) are calibrated by using buffer solutions (pH 7.00 and 9.00) at room temperature. The pH meter is first used to measure the starting pH value of the suspension at 25° C., and then, as a function of the result, potassium hydroxide solution (0.1 mol/l) or hydrochloric acid solution (0.1 mol/l) is used to adjust the pH value to 6.00. A dynamic titration method is selected with the following parameters: incremental titration volume $V_{min}$=0.05 ml to $V_{max}$=1.0 ml; waiting time between volume additions $t_{min}$=2.0 s to $t_{max}$=20.0 s. Consumption of KOH solution or of HCl solution in ml to pH 6.00 is $V_1'$. 20.0 ml of sodium chloride solution (250.00 g of NaCl (analytical grade) made up to 1 l with deionized water) are then added. 0.1 mol/l of KOH is then used for titration to a pH value of 9.00. Consumption of KOH solution in ml to pH 9.00 is $V_2'$.

The volumes $V_1'$ and, respectively, $V_2'$ are then first standardized to the theoretical starting weight of 1 g, and are multiplied by 5, to give $V_1$ and the Sears number $V_2$ in the units ml/(5 g).

Determination of Relative Breadth γ of Pore Size Distribution

This method is used to determine the relative breadth γ of the pore size distribution of silica by means of mercury porosimetry. The method is based on Hg intrusion to DIN 66133 (with surface tension of 480 mN/m and with a contact angle of 140°), using Micromeritics Autopore IV 9500 equipment.

The silica is pressure-treated prior to the measurement. For this, a manual hydraulic press is used (Catalog No. 15011, from Specac Ltd., River House, 97 Cray Avenue, Orpington, Kent BR5 4HE, U.K.). 250 mg of silica are weighed into a Specac Ltd. pellet die whose internal diameter is 13 mm, and are subjected to a load which is 1 metric ton as indicated by the display. This load is maintained for 5 s and is corrected if appropriate. The specimen is then depressurised and is dried in a drying cabinet at 105±2° C. for 4 h.

The starting weight of silica placed in the type 10 Penetrometer, having an accuracy of 0.001 g, this being selected for good reproducibility of the measurement in such a way that the "stem volume used", i.e. the percentage Hg volume consumed for filling of the penetrometer is from 20% to 40%. The penetrometer is then slowly evacuated to 50 μm of Hg and kept at this pressure for 5 min.

The Autopore equipment is operated as in the operating instructions, using Software Version IV 1.05. Each measurement is corrected by a measurement of the penetrometer under empty conditions. The measurement range is from 0.0025 to 420 MPa, and at least 136 equilibrium measurement points (equipment-specific criterion of 10 s) are used (in the range from 0.0025 to 0.25 MPa: 30 points, in the range from 0.25 to 15 MPa: 53 points, 15 to 150 MPa: 40 points, in the range from 150 to 420 MPa: 13 points). If appropriate, the software introduces further measurement points if the incremental intrusion volume is >0.04 ml/g. The intrusion curve is smoothed by means of the "smooth differentials" function of the equipment software.

Figure 1:
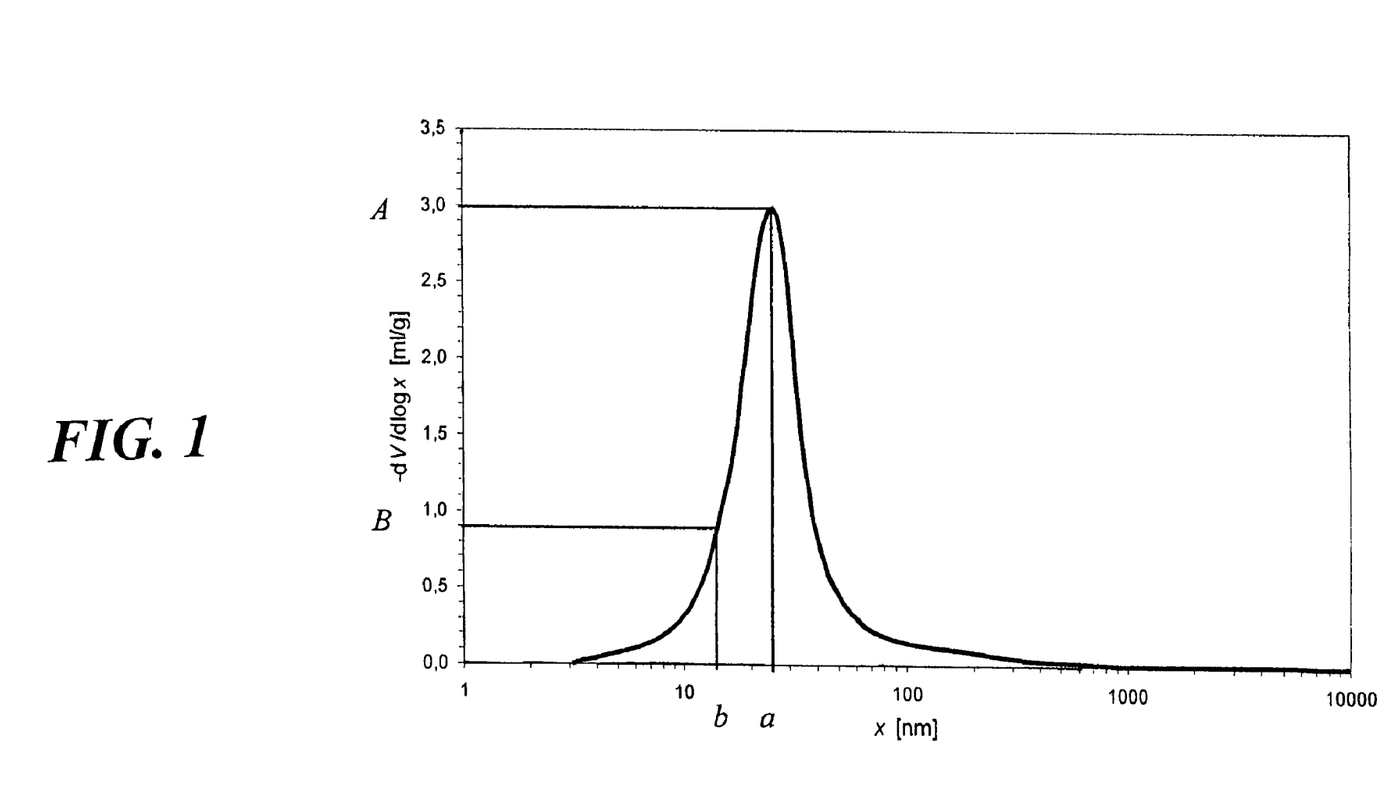
FIG. 1 shows the negative logarithmic derivative of cumulative pore volume with respect to pore diameter.

To determine the relative breadth γ of the pore size distribution, the following algorithm is applied to the data of the negative logarithmic derivative of the intrusion curve in the pore diameter range from 3.5 nm to 5 μm:

The algorithm utilizes a movable window starting from large pore diameters and composed of three successive measurement points of the negative logarithmic derivative of the intrusion curve, and draws a parabola through the points. The maximum of the parabola is defined as the required maximum A for a pore diameter a. A check is carried out as to whether the point a lies within the required pore diameter range and represents the global maximum of the negative logarithmic derivative of the intrusion curve. If that is not the case, the window is shifted by one point, a fresh parabola is drawn through the points, and the procedure is repeated until both criteria have been met. B is then defined as 0.300 A. Let b represent that pore diameter of the curve which is smaller than a, and at which the value B is achieved for the first time. Finally, the relative breadth γ of the pore size distribution is defined as γ=(a−b)/(A−B)=(a−b)/(0.7 A), where a and b have nanometer units and γ has the unit (g nm)/ml.

FIG. 1 shows a typical shape of curve for the negative logarithmic derivative of the cumulative pore volume V as in equation 1 with respect to pore diameter x with i measurement points and with the features a, b, A and B.

Equation 1:

$$\frac{dV}{d\log x} = \frac{dV}{\frac{1}{x}dx} = x\frac{dV}{dx}$$

$$x\frac{dV}{dx} \approx x\frac{\Delta V}{\Delta x}\Big|_{\Delta x = x_i - x_{i-1}} = x_i\frac{V_i - V_{i-1}}{x_i - x_{i-1}} \approx x_i\frac{V_{i+1} - V_{i-1}}{x_{i+1} - x_{i-1}}$$

Determination of Zeta Potential

This method determines the zeta potential of silica at pH 5 by means of electrokinetic sound amplitude (ESA).

To this end, the specimen is first dried to constant weight for 5 h at 105° C.±2° C., and then 100 ml of a suspension with 1% by volume of silica are produced in distilled water. The particle density needed for this is determined by means of He pyknometry (DIN 66137-2). The dispersion process continues for 5 minutes by means of an ultrasound probe (Bandelin HD2200 Sonopuls with UW2200 ultrasound transducer, power 100%, cycle 8 (80% pulse, i.e. 0.8 s of power and 0.2 s of pause) with SH 213 G booster horn, TT 13 flat titanium tip, Ø 13 mm, immersion depth 1 cm) in a 150 ml glass beaker (height 9.5 cm, external diameter 5 cm), which is cooled in an ice bath for the period of ultrasound treatment.

The suspension, brought to room temperature, is stirred with a magnetic stirrer and pumped by way of a peristaltic pump through the PPL-80 sensor of the Matec ESA-8000 device. The automatic potentiometric titration process takes place at room temperature with 5-molar $HNO_3$ and with a delay time of 30 s until a pH value of 5 has been reached. In the event that the starting pH value of the suspension is <5, the titration uses 5-molar NaOH solution until a pH value of 5 has been reached. Evaluation uses version pcava 5.94 of the equipment software.

Zeta potential is calculated at pH 5:

$$\zeta = \frac{ESA \cdot \eta}{\phi \cdot \Delta\rho \cdot c \cdot |G(\alpha)| \cdot \varepsilon}$$

ζ zeta potential [$10^{-3}$ V]
ESA electrokinetic sound amplitude at pH 5 [Pa m/V]
φ volume fraction (0.01)
Δρ difference in density between particles (see above) and liquid (0.997 kg/l)
c velocity of sound in suspension (1490 m/s)
η viscosity of liquid (0.89 cP minus 2% per ° C. deviation from 25° C.)
∈ dielectric constant of suspension (78.36 As/Vm)
|G(α)| inertial correction (function of particle radius and of density, see manual)

The average particle radius value is needed for this determination and is determined by means of dynamic light scattering, using the above suspension treated with ultrasound. To this end, the Horiba LB-500 device is used (radius=0.5×mean of volume-weighted particle distribution, calculation level=50, cell thickness 1 cm, optical model: liquid refractive index, real=1.333; material refractive index, real=1.45; imaginary=0.01).

Determination of Particle Size by Means of Laser Scattering

The use of laser scattering for determining particle sizes of powders is based on the phenomenon that particles scatter monochromatic light in all directions with a varying intensity pattern. This scattering depends on the particle size. The smaller the particles, the greater are the scattering angles.

Specimen preparation and testing (flushing of module, etc.) uses deionized water in the case of hydrophilic precipitated silica, and uses pure ethanol in the case of precipitated silica which is not sufficiently water-wettable.

Prior to the start of measurement, the LS 230 laser scattering device (Coulter) and the liquid module (Small Volume Module Plus, 120 ml, Coulter) are run warm for 2 h, and the module is flushed three times with deionized water, and calibrated, and in the case of hydrophobic precipitated silicas is flushed three times with ethanol.

The file window "Calculate Opt. model" is selected by way of the menu item "Measurement" in the control bar of the equipment software, and the refractive indices are defined in an .rfd file: liquid refractive index r.I., real=1.332 (1.359 ethanol); material refractive index, real=1.46; imaginary=0.1; form factor 1. The following items are also selected in this file window: Offset measurement, Adjustment, Background measurement, Set measurement conc., Input specimen info., Input measurement info., Measurement time 60 s, Number of measurements 1, Without PIDS data, Size distribution. The pump speed is set to 30% on the device.

The homogeneous suspension of 1 g of silica in 40 ml of deionized water is then added using a 2 ml disposable pipette to the liquid module of the device in such a way as to achieve constant concentration with from 8 to 12% light absorption, and that the device communicates "OK". The measurement takes place at room temperature. The software of the LS 230 device uses the raw data curve to calculate the particle size distribution and the d50 value (median value) on the basis of the volume distribution, taking into account Mie theory and the optical model parameters (.rfd file).

Determination of Sieve Residue (Alpine)

This determination of sieve residue uses air-jet sieving by a method based on DIN ISO 8130-1 by means of Alpine S 200 air-jet sieve equipment. To determine the $d_{50}$ values of micro-granulated materials and of granulated materials, sieves whose mesh width is >300 μm are also used here. For determination of the $d_{50}$ value, the sieves have to be selected in such a way as to give a particle size distribution from which the $d_{50}$ value can be determined as in FIG. 2. Graphical representation and evaluation uses a method based on ISO 2591-1, section 8.2.

Figure 2:
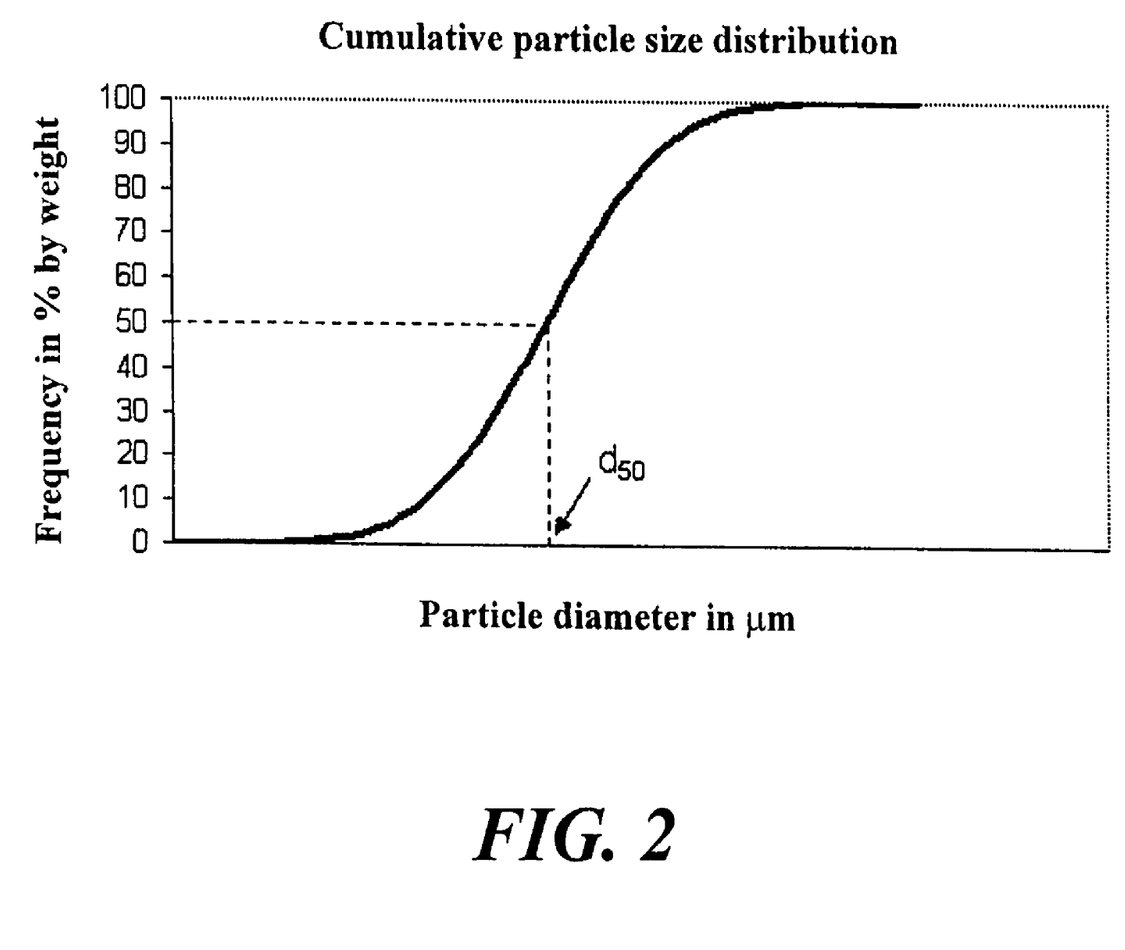
FIG. 2 shows the cumulative particle size distribution.

The $d_{50}$ value is that particle diameter in the cumulative particle size distribution at which the particle diameter of 50% of the particles is smaller than or equal to that of the particles whose particle diameter is the $d_{50}$ value.

Determination of Sieve Residue (Ro-Tap)

This method determines the content of relatively coarse particles (>300 μm) and the content of relatively fine particles (<75 μm) in granulated materials by means of sieving.

Equipment used is a sieve pan, an analysis sieve with wire gauze (DIN ISO 565 T.2, nominal mesh width 75 μm), an analysis sieve with wire gauze (DIN ISO 565 T.2, nominal mesh width 150 μm), and an analysis sieve with wire gauze (DIN ISO 565 T.2, nominal mesh width 300 μm) in each case with sieve diameter 200 mm. The sieve stack is introduced in the sequence stated into a Tyler Ro-Tap B 8260 analysis sieve machine with automatic time switch, and a homogeneous amount of 100.00 g of the granulated silica material is transferred as specimen onto the uppermost sieve. The sieve lid and the beater are superposed and the sieving process takes place for 5 min with circular oscillation and beating.

The sieve residues (Ro-Tap) are determined as follows:

sieve fraction (Ro-Tap, <75 μm) in %=$(A_S/E)$*100%, and sieve fraction (Ro-Tap, >300 μm) in %=$(A_{300}/E)$*100%, where $A_S$=final weight of residue in sieve pan in g, $A_{300}$=final weight of residue on sieve with 300 μm nominal mesh width in g and E=starting weight in g.

Determination of Carbon Content

Carbon content of silicas is determined by means of a LECO CS 244 elemental analyzer. Here, silica is weighed into a ceramic crucible and provided with combustion additives and heated under a stream of oxygen in an induction furnace. The carbon present here is oxidized to give $CO_2$. This amount of gas is quantified by way of infrared detectors.

Prior to the actual measurement, the device is calibrated with suitable reference material (e.g. tungsten carbide with 6.17% by weight of carbon). For silicas, from 150 to 200 mg are weighed with accuracy of 1 mg into a ceramic crucible. The specimen material is covered with 1 g of Lecocel II (powder of a tungsten-tin (10% strength) alloy) and 0.7 g of iron filings. The crucible is then sealed with a lid. The induction furnace is set to maximum power and flushed with oxygen for 10 s. After the crucible has then been placed in the induction furnace, automatic measurement and evaluation is started. Three determinations are carried out per specimen. The result is based on the original substance and is stated in % by weight.

Determination of Aluminum Oxide Content

Aluminum oxide content is determined by a method based on DIN EN ISO 3262-18 by means of flame atomic absorption spectroscopy at wavelength 309.3 nm. About 20 g of a silica are weighed to accuracy of 0.01 g into a platinum crucible and moistened with distilled water. 1 ml of conc. hydrofluoric acid (40%, analytical grade) is added, and the mixture is heated to a fuming temperature in a sand bath. Nitric acid is progressively added dropwise until all of the silica has been dissolved. After evaporation to dryness, the residue is dissolved in 3 ml of conc, hydrochloric acid. The cooled solution is quantitatively transferred to a 100 ml measuring beaker, where it is made up to 100 ml with distilled water.

The resultant solution is studied in a flame atomic absorption spectrometer (wavelength: 309.3 nm, slit S: 0.7 nm, gas stream: acetylene/$N_2O$) as in the operating instructions.

Aluminum oxide content is determined on the original specimen, but the content is based on the specimen ignited at 1000° C. for 2 h:

$$\% \, Al_2O_{3 \, based \, on \, ignited \, substance} = \frac{\% \, Al_2O_{3 \, based \, on \, ignited \, substance} \times 100}{100\% - \text{ignition residue in} \%}$$

Determination of Dispersion Coefficient

Dispersion coefficient can be determined by means of a topographic method, described in: Entwicklung eines Verfahrens zur Charakterisierung der Füllstoffdispersion in Gummimischungen mittels einer Oberflächentopographie [Development of a method for characterizing filler dispersion in rubber mixtures by means of surface topography] A. Wehmeier; Degree thesis 1998 at the Technical University of Münster, Steinfurt site, Chemical Engineering Department, and Filler dispersion Analysis by Topography Measurements Degussa AG, Applied Technology Advanced Fillers, Technical Report TR 820.

As an alternative, the dispersion coefficient can also be determined by means of the DIAS method (optically) at the Deutsches Institut für Kautschuktechnologie in Hanover, Germany (see H. Geisler, DIK aktuell, 1st edition (1997) and Medalia, Rubber Age, Apr. 10, 1965).

The best degree of dispersion achievable is 100%, and accordingly the worst will theoretically be 0%. Silicas whose dispersion coefficient is greater or equal to 90% are regarded as highly dispersible (HD).

Explanation of dispersion of coefficient by means of surface topography:

$$\text{Dispersion coefficient} = 100\% - \frac{(\text{Total of areas underlying peaks}) \cdot \frac{10000\% \cdot \text{Medalia factor}}{\text{Filler volume} \cdot (\text{total area tested})}}{} \%$$

$$\text{Medalia factor} = \frac{\frac{\text{Filler volume}}{100\%} + 0,78}{2}$$

Dispersion coefficient in %
Total of areas underlying peaks (measure of roughness) in $mm^2$
Filler volume in %
total area tested in $mm^2$ Having generally described this invention, a further understanding can be obtained by reference to certain specific examples which are provided herein for purposes of illustration only, and are not intended to be limiting unless otherwise specified.

EXAMPLE 1

41.6 $mm^3$ of water and 4.4 $mm^3$ of waterglass (density 1.348 kg/l, 27.0% by weight of $SiO_2$, 8.05% by weight of $Na_2O$) were used as initial charge in a reactor composed of wood (height 3.80 m, internal diameter 5.50 m) with angled base, MIC angled-blade stirrer system and Ekato fluid-shear turbine.

9.13 $m^3$/h of the abovementioned waterglass and about 680 l/h of sulfuric acid (density 1.83 kg/l, 96% by weight of $H_2SO_4$) were then fed simultaneously, with intensive stirring and shearing at a temperature of 76° C. over 41 min. Sulfuric acid was metered onto the shear turbine and this metering was controlled in such a way as to give a prevailing alkali number of 30.0 +/−0.3 in the reaction medium. Both additions of raw material were stopped, and the suspension obtained was intensively stirred and sheared for 60 min at the temperature reached, which was 78° C. Finally, while intensive stirring and shearing were continued, 12.50 $m^3$/h of the abovementioned waterglass and about 930 l/h of the abovementioned sulfuric acid were fed simultaneously over 46 min. Again, metering of sulfuric acid was controlled in such a way that the prevailing alkali number in the reaction medium was 30.0+/−0.3. Temperature reached after the addition was 81° C. Waterglass addition was stopped, and addition of sulfuric acid was continued at 930 l/h until a pH of 9.0 (measured at room-temperature) had been reached. The suspension was heated at 90° C. using steam at atmospheric pressure within a period of 20 min and was intensively stirred and sheared for 60 min at this temperature. Directly thereafter, addition of sulfuric acid at 930 l/h was resumed until a pH of 7.0 (measured at room temperature) had been reached. The final pH value of the suspension, which was 3.9 (measured at room temperature) was established using metering of sulfuric acid at 500 l/h.

The suspension obtained was filtered using a membrane filter press, and the filter cake was washed with water. The filter cake, whose solids content was 23% by weight, was then dried using a spin-flash dryer, and roll-granulated. The roll-granulation process uses a WP 50N/75 roll compactor from Alexanderwerk AG. The pulverulent product here was deaerated (subatmospheric pressure of 0.3 bar) via a vacuum system, without further addition of binders or liquids, by way of a horizontal infeed system with single screw (rotation rate 86 rpm), and simultaneously introduced between the bilaterally mounted, vertically arranged rolls. The powder was pressed at a rotation rate of 11 rpm and a pressure of 14 bar to give a crust, and was comminuted by means of a breaker (mesh width 8 mm). The fines were removed by sieving (mesh width 1.2 mm) using a vibrating sieve and were returned to the powder supply.

Table 1 lists the physicochemical data for a representative specimen of the pulverulent product obtained (Example 1a) and of the granulated product obtained (Example 1b).

EXAMPLE 2

1200 l of water and 172.4 kg of waterglass (density 1.348 kg/l, 27.0% by weight of SiO2, 8.05% by weight of $Na_2O$) were used as initial charge in a jacketed reactor (height 1.60 m, internal diameter 1.60 m) composed of stainless steel with dished end, MIC angled-blade stirrer system and Ekato fluid-shear turbine. 5.85 kg/min of the abovementioned waterglass and about 0.65 kg/min of sulfuric acid (density 1.83 kg/l, 96% by weight of $H_2SO_4$) were then fed simultaneously, with intensive stirring and shearing at a temperature of 65° C. over 35 min. Sulfuric acid was metered onto the shear turbine and this metering was controlled in such a way as to give a prevailing alkali number of 30.0+/−0.3 in the reaction medium. Both additions of raw material were stopped, and the suspension obtained was intensively stirred and sheared for 60 min at 65° C. Finally, while intensive stirring and shearing at 65° C. were continued, 8.00 kg/min of the abovementioned waterglass and about 0.90 kg/min of the abovementioned sulfuric acid were fed simultaneously over 50 min. Again, metering of sulfuric acid was controlled in such a way that the prevailing alkali number in the reaction medium was 30.0+/−0.3. Waterglass addition was stopped, and addition of sulfuric acid was continued at 0.90 kg/min until a pH of 9.0 (measured at room temperature) had been reached. The suspension was heated at 90° C. using indirect steam by way of the jacket heating system within a period of 40 min and was intensively stirred and sheared for 60 min at this temperature. Directly thereafter, addition of sulfuric acid at 0.90 kg/min was resumed until a pH of 7.0 (measured at room temperature) had been reached. The final pH value of the suspension, which was 3.1 (measured at room temperature) was established using metering of sulfuric acid at 0.45 kg/min.

The suspension obtained was filtered using a membrane filter press, and the filter cake is washed with water. The filter cake, whose solids content was 23% by weight was then liquidized, using water and the abovementioned sulfuric acid and a dissolver. The silica feed with 21% by weight solids content and with a pH value of 4.5 was then spray-dried with added ammonia in such a way that the pH value of the final product, measured on a 5% strength suspension, becomes 5.9, and the product was granulated by a method based on Example 1 at a rotation rate of 13 rpm and a pressure of 20 bar.

Table 1 lists the physicochemical data for a representative specimen of the pulverulent product obtained (Example 2a) and of the granulated product obtained (Example 2b).

EXAMPLE 3

1205 l of water and 172.4 kg of waterglass (density 1.348 kg/l, 27.0% by weight of $SiO_2$, 8.05% by weight of $Na_2O$) were used as initial charge in a jacketed reactor (height 1.60 m, internal diameter 1.60 m) composed of stainless steel with dished end, MIC angled-blade stirrer system and Ekato fluid-shear turbine. 5.85 kg/min of the abovementioned waterglass and about 0.65 kg/min of sulfuric acid (density. 1.83 kg/l, 96% by weight of $H_2SO_4$) were then fed simultaneously, with intensive stirring and shearing at a temperature of 60° C. over 45 min. Sulfuric acid was metered onto the shear turbine and this metering was controlled in such a way as to give a prevailing alkali number of 30.0+/−0.3 in the reaction medium. Both additions of raw material were stopped, and the suspension obtained was intensively stirred and sheared for 60 min at 60° C. Finally, while intensive stirring and shearing at 65° C. were continued, 8.00 kg/min of the abovementioned waterglass and about 0.90 kg/min of the abovementioned sulfuric acid were fed simultaneously over 43 min. Again, metering of sulfuric acid was controlled in such a way that the prevailing alkali number in the reaction medium was 30.0+/−0.3. Waterglass addition was stopped, and addition of sulfuric acid was continued at 0.90 kg/min until a pH of 9.0 (measured at room temperature) had been reached. The suspension was heated at 90° C. using indirect steam by way of the jacket heating system within a period of 40 min and was intensively stirred and sheared for 60 min at this temperature. Directly thereafter, addition of sulfuric acid at 0.90 kg/min was resumed until a pH of 7.0 (measured at room temperature) had been reached. The final pH value of the suspension, which was 3.2 (measured at room temperature) was established using metering of sulfuric acid at 0.45 kg/min.

The suspension obtained was filtered using a membrane filter press, and the filter cake was washed with water. The filter cake, whose solids content was 21% by weight was then liquidized, using water and the abovementioned sulfuric acid and a dissolver. The silica feed with 18% by weight solids content and with a pH value of 4.1 was then spray-dried with added ammonia in such a way that the pH value of the final product, measured on a 5% strength suspension, becomes 5.6, and the product was granulated by a method based on Example 1 at a rotation rate of 12 rpm and a pressure of 18 bar. Table 1 lists the physicochemical data for a representative specimen of the pulverulent product obtained (Example 3a) and of the granulated product obtained (Example 3b).

TABLE 1

| | Unit | Example 1a | Example 1b | Example 2a | Example 2b | Example 3a | Example 3b |
|---|---|---|---|---|---|---|---|
| Available form | | Powder | Granulated material | Powder | Granulated material | Powder | Granulated material |
| Moisture level | % | 5.7 | 5.7 | 5.6 | 5.8 | 5.6 | 5.4 |
| pH value | — | 7.0 | 7.2 | 5.9 | 5.9 | 5.6 | 5.8 |
| Conductivity | µS/cm | 380 | 400 | 280 | 260 | 570 | 580 |
| BET surface area | $m^2/g$ | 127 | 125 | 149 | 155 | 205 | 203 |
| CTAB surface area | $m^2/g$ | 113 | 113 | 133 | 134 | 171 | 173 |
| DBP absorption | g/(100 g) | 285 | 244 | 271 | 219 | 263 | 233 |
| Sears number $V_2$ | ml/(5 g) | — | 26.3 | 26.7 | 27.1 | 29.0 | 29.6 |
| Sears number $V_2$/CTAB | ml/(5 $m^2$) | — | 0.233 | 0.201 | 0.202 | 0.170 | 0.171 |
| BET/CTAB | — | 1.12 | 1.11 | 1.12 | 1.16 | 1.20 | 1.17 |
| Zeta potential | mV | — | −17.3 | — | −15.5 | −17.6 | −16.3 |
| Relative breadth γ of pore size distribution | (g nm)/ml | — | 4.6 | 7.0 | 7.1 | 5.0 | 5.2 |
| Sieve residue (Ro-Tap, >300 µm) | % | — | 88.2 | — | 88.9 | — | 92.4 |
| Sieve fraction (Ro-Tap, <75 µm) | % | — | 4.5 | — | 4.5 | — | 2.6 |
| $Al_2O_3$ content | % | — | 0.14 | 0.13 | 0.14 | 0.13 | 0.13 |

Application-Related Examples

Examples 1b, 2b, 3b: Production of rubber mixtures and vulcanizates

General Procedure Specification:

The formulation (Standard Green Tire) used for the rubber mixtures is stated in Table 2 below. The unit "phr" here means parts by weight based on 100 parts of the untreated rubber used.

TABLE 2

Standard Green Tire

| Substance | phr | Product name | Company |
|---|---|---|---|
| 1. Stage Primary mixing | | | |
| Buna VSL 5025-1 | 96 | S-SBR; oil-extended (see Text) | Lanxess Europe GmbH & Co. KG; 51369 Leverkusen; Germany |
| Buna CB 24 | 30 | cis-1,4-BR (see Text) | Lanxess Europe GmbH & Co. KG; 51369 Leverkusen; Germany |
| silica of the present invention (KS) | 80 | | |
| X 50-S | 12.8 | Si 69 (Bis(3-triethoxysilylpropyl)tetrasulfane)/ N 330 carbon black: 50%/50% | Degussa AG; Frankfurt am Main; Germany |
| ZnO; RS RAL 844 C | 3.0 | ZnO | Arnsperger Chemikalien GmbH; 50858 Cologne; Germany |
| EDENOR ST1 GS | 2.0 | Palmitic stearic acid; stearin "iodine number 1" | Caldic Deutschland GmbH & Co. KG; 40231 Dusseldorf; Germany |
| Naftolen ZD | 10.0 | aromatic plasticizer oil | Chemetall GmbH; 60487 Frankfurt a.M.; Germany |
| Vulkanox 4020/LG | 1.5 | N-(1,3-dimethylbutyl)-N'-phenyl-p-phenylenediamine (6PPD) | Rhein Chemie Rheinau GmbH; 68219 Mannheim Rheinau; Germany |
| Protektor G 3108 | 1.0 | Mixtures of refined hydrocarbon waxes | Paramelt BV; 706875 Paramelt BV; NL 1704 RJ Heerhugowaard; The Netherlands |
| 2. Stage Remill stage | | | |
| Batch from stage 1 | | | |
| 3. Stage Final mixing | | | |
| Batch from stage 2 | | | |
| Vulkacit D | 2.0 | N,N'-diphenylguanidine (DPG) | Rhein Chemie Rheinau GmbH; 68219 Mannheim Rheinau; Germany |
| Vulkacit CZ/EG-C | 1.5 | N-cyclohexyl-2-benzothiazolesulfenamide (CBS) | Rhein Chemie Rheinau GmbH; 68219 Mannheim Rheinau; Germany |
| Perkacit TBZTD | 0.2 | Tetrabenzylthiuram disulfide (TBzTD) | Flexsys N.V./S.A., Woluwe Garden; B-1932 St. Stevens Woluwe; Belgium |
| Ground sulphur | 1.5 | Fine-particle sulfur Ph Eur, BP | Merck KGaA; 64271 Darmstadt; Germany |

The polymer VSL 5025-1 is a solution-polymerized SBR copolymer from Bayer AG (now Lanxess Europe GmbH & Co. KG) whose styrene content (by means of UV spectroscopy) is 25+/−2% by weight and whose vinyl content (by means of IR spectroscopy) is about 50+/−4% by weight. The copolymer comprises about 27% by weight of aromatic mineral oil (from 25.8 to 28.8% by weight) and its Mooney viscosity (ASTM D1646) is about 50+/−5 MU.

The polymer Buna CB 24 is a cis-1,4-polybutadiene (titanium type) from Bayer AG (now Lanxess Europe GmbH & Co. KG) whose cis-1,4 content (by means of IR spectroscopy) is at least 96% by weight and whose Mooney viscosity (DIN 53523) is about 45 MU (39 MU-49 MU).

TABLE 3

Mixing specification

| | | |
|---|---|---|
| 1st stage | | GK 1.5N internal mixer, fill level 0.73, 70 rpm, chamber temperature 70° C., ram pressure 5.5 bar |
| | 0.0'-0.5' | Polymers |
| | 0.5'-1.5' | ⅓ KS, X 50-S; purge at 1.5' |
| | 1.5'-2.5' | ⅓ KS; purge at 2.5' |
| | 2.5'-3.5' | ⅓ KS, remaining constituents; purge at 3.5' |
| | 3.5'-5.0' | Mixing, if appropriate variation of rotation rate required in order to achieve discharge temperature |
| | 5.0' | Discharge batch (batch temperature from 145° C. to 155° C.) and transfer to roll: Peel milled sheet away |
| 24 h of intermediate storage at room temperature for stage 2 | | |
| 2nd stage | | GK 1.5N internal mixer, fill level 0.71, 80 rpm, chamber temperature 80° C., ram pressure 5.5 bar |
| | 0.0'-2.0' | Plasticize batch from stage 1 |
| | 2.0'-5.0' | Use rotation rate variation to keep batch temperature at 150° C. |
| | 5.0' | Discharge batch (batch temperature from 145° C. to 155° C.) and transfer to roll: Peel milled sheet away |
| 4 h of intermediate storage at room temperature for stage 3 | | |
| 3rd stage | | GK 1.5N internal mixer, fill level 0.69, 40 rpm, chamber temperature 50° C., ram pressure 5.5 bar |
| | 0.0'-2.0' | Batch from stage 2, accelerator, sulfur |
| | 2.0' | Discharge batch (batch temperature from 90° C. to 110° C.) and transfer to roll: Cut and displace the material 3 times toward the left, 3 times toward the right Fold the material over 5 times narrow, 5 times wide, Peel milled sheet away |

12 h of intermediate storage at room temperature prior to start of tests

The general method for production of rubber mixtures and their vulcanizates is described in the following book: "Rubber Technology Handbook", W. Hofmann, Hanser Verlag 1994.

The vulcanization time for each of the specimens at 165° C. was 15 min for Example 1b and 2b and 20 min for Example 3b.

The test methods stated in Table 4 were used for vulcanizate testing.

TABLE 4

| Physical testing | Standard/Conditions |
|---|---|
| Vulkameter testing, 165° C., RPA, 1.6 Hz, 42% amplitude Dmax (dNm) Dmax-Dmin (dNm) | DIN 53529/3, ISO 6502 |

TABLE 4-continued

| Physical testing | Standard/Conditions |
|---|---|
| Vulkameter testing, 165° C., 0.5° deflection MDR rheometer t 90% t 80%-t 20% (min) | DIN 53529/3, ISO 6502 |
| Ring tensile test, 23° C. Stress value (MPa) | DIN 53504, ISO 37 |
| Shore A hardness, 23° C. (SH) | DIN 53 505 |
| Ball rebound (%), 60° C. | DIN EN ISO 8307, drop height. 500 mm, steel ball, d = 19 mm, 28 g |
| DIN abrasion, force 10 N (mm$^3$) | DIN 53 516 |
| Dispersion coefficient (%) | see text |
| Viscoelastic properties, Initial force 50 N, amplitude force 25 N, heat-conditioning time 5 min, test value recorded after 30 s of test time Complex modulus E* (MPa) Loss factor tan δ (—) | DIN 53 513, ISO 2856 |

The tables presented below show the application-related data for Examples 1b, 2b and 3b, which were compounded and tested as in Tables 2-4.

TABLE 5

|  |  | Ultrasil VN 2 GR | Example 1b |
|---|---|---|---|
| Dmax | dNm | 44.9 | 48.1 |
| Dmax-Dmin | dNm | 38.6 | 40.8 |
| t 90% | min | 6.6 | 5.0 |
| t 80%-t 20% | min | 2.4 | 1.7 |
| 300% stress value | MPa | 11.6 | 12.5 |
| Shore A hardness | SH | 65 | 64 |
| DIN abrasion | mm$^3$ | 116 | 113 |
| Ball rebound | % | 58.6 | 66.0 |
| E*, 60° C., 16 Hz | MPa | 9.7 | 9.1 |
| tan$_δ$, 60° C., 16 Hz | — | 0.124 | 0.103 |

TABLE 6

|  |  | Ultrasil 7000 GR | Example 2b |
|---|---|---|---|
| Dmax | dNm | 43.6 | 47.8 |
| Dmax-Dmin | dNm | 35.8 | 40.1 |
| t 90% | min | 6.4 | 5.5 |
| t 80%-t 20% | min | 2.5 | 1.8 |
| 300% stress value | MPa | 10.1 | 12.4 |
| Shore A hardness | SH | 65 | 66 |
| DIN abrasion | mm$^3$ | 125 | 116 |
| Ball rebound | % | 60.6 | 64.5 |
| E*, 60° C., 16 Hz | MPa | 10.7 | 10.3 |
| tan$_δ$, 60° C., 16 Hz | — | 0.155 | 0.127 |

TABLE 7

|  |  | Ultrasil 7005 | Example 3b |
|---|---|---|---|
| Dmax | dNm | 46.9 | 48.9 |
| Dmax-Dmin | dNm | 37.2 | 39.0 |
| t 90% | min | 8.4 | 7.1 |
| t 80%-t 20% | min | 3.7 | 3.0 |
| 300% stress value | MPa | 10.8 | 12.6 |
| Shore A hardness | SH | 68 | 69 |
| DIN abrasion | mm$^3$ | 107 | 103 |
| Ball rebound | % | 58.8 | 58.9 |
| E*, 60° C., 16 Hz | MPa | 10.9 | 11.8 |
| tan$_δ$, 60° C., 16 Hz | — | 0.138 | 0.133 |

References used in the Standard Green Tire formulation were commercially available silicas from Degussa AG, the CTAB surface area range of which (see Table 8) was the same as that of the respective silica of the present invention to be tested. This ensures that the vulcanizate results were effectively comparable.

TABLE 8

|  | Unit | Ultrasil VN 2 GR | Ultrasil 7000 GR | Ultrasil 7005 |
|---|---|---|---|---|
| BET surface area | m$^2$/g | 127 | 172 | 180 |
| CTAB surface area | m$^2$/g | 129 | 158 | 171 |
| relative breadth γ of pore size distribution | (g nm)/ml | 3.8 | 3.4 | 3.5 |

When the untreated mixture data were compared in the MDR and in the RPA, all three of the silicas of the present invention feature markedly increased maximum torque Dmax, and therefore increased crosslinking density (Dmax–Dmin). The result of this was advantages in reinforcement, the effect of these being an increased 300% stress value and a reduced DIN abrasion value, with respectively comparable Shore A hardness. There was moreover an advantageous increase in the crosslinking rates t 80%-t 20% in all of the examples in Tables 5 to 7. The advantages of the precipitated silicas of the present invention were also clearly discernible in the dynamic data. Here, improvements were obtained with respect to hysteresis loss, and this was discernible from the increased ball rebound and the reduced tan δ values. A conclusion that can be drawn from this was that these novel precipitated silicas when incorporated into a compounded tire tread material will exhibit improved rolling resistance and therefore lower vehicle fuel consumption, while at the same time abrasion performance was good or improved.

For all three of the precipitated silicas studied (Example 1b, 2b and 3b) the dispersion coefficients were greater than or equal to 90% and the materials were therefore classified (Table 9) as highly dispersible (HD) silicas.

TABLE 9

| Medalia dispersion coefficients | | |
|---|---|---|
| Example 1b | Example 2b | Example 3b |
| 98% | 95% | 90% |

The vulcanizate performance described was in particular attributable to the breadth γ of the pore size distribution. Silica morphologies were present which were substantially more stable than those known hitherto and which therefore, despite good dispersibility, remain present even after incorporation into the rubber matrix. The result of this was regions with high silica density and regions in which the polymer matrix prevails, and the latter regions here especially lead to markedly lower hysteresis losses.

More polymer was coupled than was generally customary by way of the bifunctional silane, especially by virtue of the high number of silanol groups and of the high density of silanol groups (Sears number V$_2$/CTAB). Very good reinforcement performance was produced, and this was indicated via the high 300% stress value and the low DIN abrasion value.

By virtue of the low zeta potential of the silicas of the present invention and of the attendant increased surface activity, it was possible to achieve a marked increase in polymer/silica interaction, which was normally small because of the different polarities, this improvement was indicated via the increased reinforcement performance and the increased Dmax−Dmin values.

This performance was supported via very low microporosity, the result here being that less low-molecular-weight compounds, e.g. accelerators or activators, were removed from the reaction equilibrium. This contributes to more effective vulcanization, thus producing higher crosslinking density in conjunction with improved reinforcement.

German patent application 10 2005 043 202.6 filed Sep. 9, 2005, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A precipitated silica, having the following physico-chemical parameters:

| | |
|---|---|
| a relative breadth γ of pore size distribution of | 4.0-10.0 (g nm)/ml, |
| a BET surface area of | 90-320 m²/g, |
| a CTAB surface area of | 100-200 m²/g, |
| a Sears number $V_2$ of | 26-40 ml/(5 g), and |
| Sears number $V_2$/CTAB ratio of | 0.16-0.28 ml/(5 m²). |

2. The precipitated silica according to claim 1, wherein the BET/CTAB ratio is ≧0.9 and ≦1.6.

3. The precipitated silica according to claim 1, wherein a zeta potential at pH 5 is from −12 to −30 mV.

4. The precipitated silica according to claim 1, wherein an oil adsorbency measured as DBP number is from 200 to 330 g/(100 g).

5. The precipitated silica according to claim 1, wherein an $Al_2O_3$ content is from 0.001 to 5% by weight.

6. The precipitated silica according to claim 1, which is in the form of a granulated material, and wherein a (Ro-Tap) sieve residue on a 300 μm sieve is at least 80% by weight.

7. The precipitated silica according to claim 1, which is in the form of a granulated material, and wherein a <75 μm (Ro-Tap) sieve fraction is at most 10% by weight.

8. The precipitated silica according to claim 1, having a carbon content of from 0.1 to 20.0% by weight.

9. The precipitated silica according to claim 1, which has a Sears number $V_2$ of 28-40 ml/(5 g).

10. The precipitated silica according to claim 1, which has a Sears number $V_2$ of 30-40 ml/(5 g).

11. The precipitated silica according to claim 1, which has a Sears number $V_2$ of 32-40 ml/(5 g).

12. The precipitated silica according to claim 1, which has a Sears number $V_2$ of 34-40 ml/(5 g).

13. The precipitated silica according to claim 1, which has a Sears number $V_2$ of 36-40 ml/(5 g).

14. The precipitated silica according to claim 1, which has a Sears number $V_2$ of 38-40 ml/(5 g).

15. An elastomer mixture, a vulcanizable rubber mixture or a vulcanizate, comprising the precipitated silica according to claim 1.

16. A vulcanizable rubber mixture or vulcanizate, comprising:
at least one precipitated silica according to claim 1, as filler.

17. A tire, comprising:
at least one precipitated silica according to claim 1.

18. A process for producing the precipitated silica according to claim 1, comprising in succession:
a) using an aqueous solution of at least one member selected from the group consisting of an alkali metal silicate, an alkaline earth metal silicate, an organic base, an inorganic base and mixtures thereof as initial charge, the alkali number of the initial charge being from 20 to 40,
b) simultaneously metering into said initial charge alkali metal silicate, alkaline earth metal silicate or mixtures thereof and an acidifier with stirring at from 55 to 85° C. until a viscosity rises,
c) stopping the feed for from 35 to 85 minutes,
d) simultaneously feeding alkali metal silicate, alkaline earth metal silicate or mixtures thereof and acidifier at a temperature of from 55 to 85° C., until a solids content of from 90 to 140 g/l has been reached,
g) continuing stirring of a resultant suspension for from 1 to 120 minutes at from 80 to 98° C.,
h) acidifying said suspension with an acidifier to a pH of from 2.5 to 5.0, and
i) filtering of said suspension to obtain said precipitated silica and drying of said precipitated silica.

* * * * *